United States Patent Office 3,199,618
Patented Aug. 10, 1965

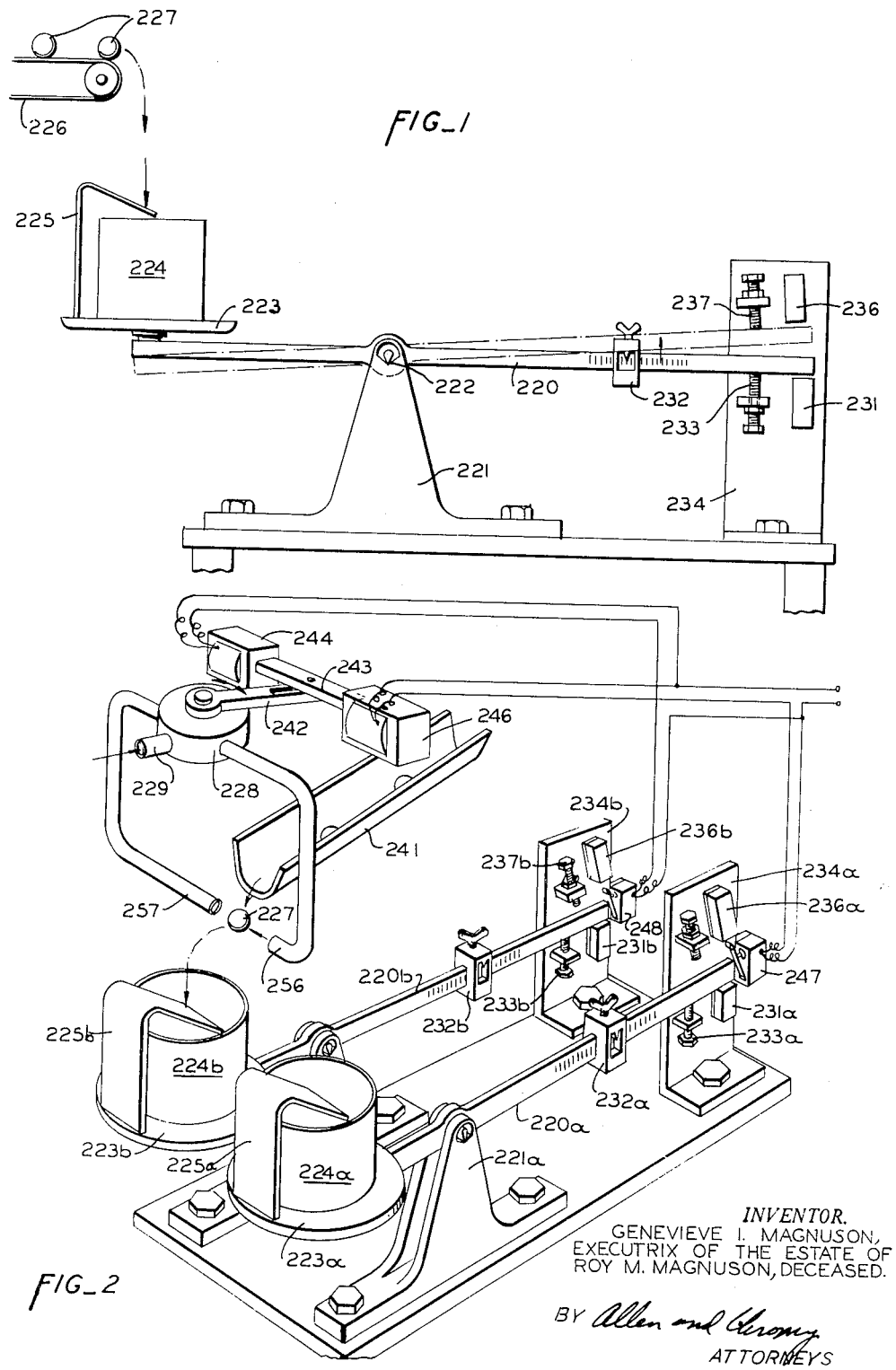

3,199,618
ARTICLE WEIGHING APPARATUS AND
METHOD
Roy M. Magnuson, deceased, late of Saratoga, Calif., by
Genevieve I. Magnuson, executrix, Saratoga, Calif., assignor of one-half to Genevieve I. Magnuson and one-half to Genevieve I. Magnuson, Robert Magnuson, and Lois J. Fox, trustees
Original application Aug. 6, 1956, Ser. No. 602,355, now Patent No. 2,990,665, dated July 4, 1961. Divided and this application Sept. 19, 1960, Ser. No. 57,604
3 Claims. (Cl. 177—1)

This application is a division of co-pending application Serial No. 602,355, now Patent Number 2,990,665, filed August 6, 1956 for Article Feeding Apparatus and Method.

The present invention relates to the provision of measured quantities of articles, such as food articles, by weight, in which a single moving file of the articles is formed as an untimed progression, in which progressing file the articles have a random spacing, and in which subsequent falling of the articles one by one into a container takes place to provide a desired quantity in the container by weight.

More particularly the invention is concerned with the feeding of articles of the above character and in the above manner in which the feeding and counting can be made regardless of differences in the articles of kind, shape, size, positioning, relative spacing in relation to each other, or weight.

It is a general object of the invention to provide improved apparatus and methods for segregating a definite quantity of articles.

Another general object of the invention is to provide improved methods and apparatus for filling articles into containers in which the articles are measured by weight by employing the impact effect as they are fed into the container.

A further general object of the invention is to provide improved methods and apparatus for filling articles into containers in which the articles are projected one by one through space for a fixed distance and at a standard or uniform velocity so that the impact and momentum effect on the container and its support by each article affords a measure of the weight of the article.

The above and other objects of the invention are attained as disclosed in the accompanying description, taken in connection with the attached drawings, in which:

FIG. 1 is a schematic view of one form of impact-responsive or momentum-responsive weighing mechanism.

FIG. 2 is a schematic perspective view of another form of impact-responsive weighing mechanism.

In the art of filling articles by count into containers such as cans for example, previous attempts to solve this problem have been directed universally along the line of obtaining a timed flow of containers and delivering a timed flow of articles to the containers, the exact control of timing being relied upon to insure accuracy. The present invention provides an untimed flow of articles in controlled fashion so that at any time the operation is interrupted it will stop and when restarted will pick up again at the same point. This control is obtained by making an exact count of the articles by counting the weight of the article until a desired minimum weight is reached in the container.

Counting by weight

The invention (illustrated schematically in FIGURES 1 and 2) is adaptable particularly to the weight filling the food products where the individual units are of appreciable weight and size so as to individually affect the filling of a container to desired weight, the fill of an exact number of units to achieve a desired net weight without any excess fill of a unit is effected. In such operations the filling sequence contemplates the rough under-filling of the container with an amount of the product known to be less than the desired weight, then effecting a unit-by-unit fill of the product until it exceeds the desired weight by less than the weight of one unit. In conventional methods for this type of operation it has been necessary to let the weighing mechanism come to rest between each successive weighing operation in order to obtain an exact weight of the product. In accordance with this invention the factor of momentum is employed, and each individual unit has imparted thereto a desired uniform or standard velocity in a given direction so that when it impacts the container support, its momentum is employed as a measure of its mass, whose effect will be substantially larger than that of the mass alone. This results in reducing the overall sensitivity of the apparatus to measure to a given accuracy. Preferably restraining means are associated with the weighing member so that it will remain in its initial position of rest until the desired weight filling or counting of the product by weight is obtained.

Referring to FIGURE 1, in particular, the apparatus includes a weight arm 220 which is pivotally mounted on its bracket support 221 by a knife edge support 222. At one end this balance arm is provided with a platform 223 to receive a container 224 and preferably the container 224 is spaced sufficently below the point of feed, illustrated as conveyor 226, to provide the desired velocity of an article at the time it reaches a rigid impact blade 225 secured to the platform 223 and overlying and discharging into the container 224. Any suitable means may be provided in connection with the conveyor 226 to provide a unit-by-unit feed of the articles 227.

The other end of the balance arm 220 has associated therewith a lower permanent magnet 231 which holds it in its normal rest position and an adjustable weight 232 for adjusting the weight of the products to be measured. The magnet 231 holds the arm 220 in engagement with adjustable stop 233 carried with the magnet 231 and a bracket 234. Spaced above the arm is a second permanent magnet 236 for holding the arm elevated once the desired weight relation is obtained, the arm being stopped by the upper stock 237.

In the operation of the apparatus shown in FIG. 1, the weight 232 is adjusted with reference to its cooperating scale on the balance arm 220 so that the downward force of the weight 232, at its position on the balance arm, and the downward force of the permanent magnet 231 form together a measure of the desired minimum weight to be placed into the container 224. In the weighing of articles such as cherries or prunes, the articles will vary slightly in weight from one article to another, and so it is impossible to fill to an exact weight and it is desired to count the articles by weight so that the last article, when its weight is added to the container, will overbalance the scale mechanism and the counting or weighing operation can be stopped. Thus, with articles of this type, each container will be overfilled by not more than the weight of one article. With expensive articles such as cherries and the like, this is important in a canning operation and the fact of not overfilling the container with an excess article can make a substantial difference in the profit picture for an entire canning operation. The articles such as shown in 227 are dropped one-by-one onto the impact plate 225 so that it exerts a force in proportion to its weight tending to rock the scale means counter-clockwise, the subsequent drop of the impact blade 225 into the container 224 being negligible. In other words, if the weight of a given article dropping onto the impact plate 225 is insufficient to separate the balance arm 220 from the holding magnet 231, the subsequent drop of this article for a shorter distance into container 224 from the impact plate 225 will also not accomplish this separation.

When the weight of the articles in the container 224 is slightly under the desired weight so that the weight of one article dropping is sufficient to over-balance the control weight 232 and the magnet 231, the next article, when dropped due to its momentum in hitting the impact blade 225 will effect separation of the end of the balance arm 220 from the holding magnet 231 and raise it up to its dotted line position where it will be held by magnet 236, indicating that the weighing operation has been finished. Then the filled container 224 can be removed and another one inserted. Because the mass of a given article is employed as one factor of the momentum of the article, the sensitivity of the apparatus in measuring to a given accuracy is reduced, and the weighing method and apparatus provides for filling of the container with the desired weight of articles with a minimum number of articles to obtain this weight.

The above apparatus illustrates schematically the method employed in this modification whereby the number of units can be counted into a container by measuring the total mass thereof, the actual weight effect of any given unit being felt by measuring its momentum.

FIGURE 2 illustrates a further modified form of the apparatus in which the two scale members 220a and 220b are provided in association with a unit-by-unit feed in the form of a trough 241 which is symmetrically arranged with respect to the two containers 224a and 224b resting on the platforms 223a and 223b.

Also associated with the trough 241 and the containers 224a and 224b are a pair of air nozzles 256 and 257 which are adapted to receive air from an intake pipe 229. In normal operation only one of the air jets is effective as shown by the arrow in FIGURE 2, and this air jet from the nozzle 226 will deliver articles to the container 224b. It will be noted that the lateral movement of an article accomplished by the air jet 226 will not affect its gravity fall but merely relates to the direction of fall.

The valve 228 is controlled by a slotted arm 242 connected to a slidable armature 243 for a pair of opposed solenoids 244 and 246. These solenoids are connected in suitable electric circuit with respective switches 247 and 248 having their switch arms lying respectively in the path of movement of balance levers 220a and 220b, respectively.

Thus, when a container counts by weight to the desired fill, an associated switch controls the energization of the appropriate solenoid to change the direction of the air jet and cause subsequent units to be placed in the other of the two containers. For example, if the articles 227 are being directed into the container 224b, as shown in FIG. 2, the scale arm 220b under the influence of the weight 232b and the permanent magnet 231b operate as described in connection with the modification of FIG. 1. When the desired weight is reached in the container 224b and the scale arm 220b is rocked counterclockwise as viewed in FIG. 2, the end of the arm, in moving up, closes the switch 248 to energize the solenoid 244 and shift the armature 243 so as to change the control of the valve 228 to direct the air to the nozzle or pipe 257 so as to direct subsequent article-dropping into the container 224a. The switch 247 and the control of the balance arm 220a operate in the same fashion when the fill of the container 224a is completed to reverse the control of the air by energizing the associated solenoid 246 to restore the valve 228 and to control the air to the condition shown in FIG. 2.

In the above description it should be understood that the word "containers" is used broadly and not only refers to articles ordinarily known as containers such as boxes, bottles and cans, but refers to any receptacle wherein it would be desired to place a given desired amount of articles, either of the same kind, or a mixture, and wherein the measuring of the articles is done by counting either by units or by weight.

While certain preferred embodiments of apparatus have been shown and described, as well as certain methods of carrying out the invention, it will be apparent that the invention is capable of variation and modification from the forms and procedures disclosed, so that the scope thereof should be limited only by the proper scope of the claims appended hereto.

What is claimed is:

1. A method of providing measured quantities of articles of unknown mass to provide a total unknown mass which varies from a desired mass by the weight of one article or less, which comprises imparting a standard or uniform velocity to each article, causing each article to travel for a fixed distance to a point of impact where a mass is present or accumulated, and individually measuring the impact of each article on the mass as a measure of the total weight of the mass when the article is added thereto.

2. An impact or momentum weighing scale comprising a pivotally supported scale member having one end constructed to receive a product to be weighed, a magnet associated with the scale member to oppose the weight of said weighing end, an impact member on said weighing end, and means for effecting feeding of articles at a standard or uniform velocity to impact said impact member after travelling a fixed distance.

3. An impact or momentum weighing device comprising a movable impact member, said member having a portion constructed to receive the impact of the product to be weighed, means for effecting feeding of a series of articles to said portion at a standard and uniform velocity to impact said portion after traveling a fixed distance, and means responsive to the movement of said impact member under the influence of the momentum of one article of said series for providing a measure of the weight of the article.

References Cited by the Examiner

UNITED STATES PATENTS

| | | | |
|---|---|---|---|
| 1,583,109 | 5/26 | Banschbach | 73—11 |
| 2,037,484 | 4/36 | Raymer | 177—52 X |
| 2,200,028 | 5/40 | Kudo | 73—11 |
| 2,357,783 | 9/44 | Snelling | 177—52 X |
| 2,451,534 | 10/48 | Christensen | 177—53 |
| 2,634,085 | 4/53 | Allen et al. | 177—54 |
| 2,781,993 | 2/57 | Magnuson | 177—1 |

LEO SMILOW, *Primary Examiner.*

ISAAC LISANN, *Examiner.*